United States Patent [19]

Autry

[11] 4,142,549
[45] Mar. 6, 1979

[54] RELIEF VALVE

[75] Inventor: Steven R. Autry, Massillon, Ohio

[73] Assignee: The B. F. Goodrich Company, Akron, Ohio

[21] Appl. No.: 834,084

[22] Filed: Sep. 19, 1977

[51] Int. Cl.² ............................................. F16K 17/20
[52] U.S. Cl. ................................. 137/469; 137/538; 137/543.21
[58] Field of Search ............ 137/469, 472, 538, 543.21

[56] References Cited

U.S. PATENT DOCUMENTS

| | | | |
|---|---|---|---|
| 1,305,946 | 6/1919 | Dickson | 137/469 |
| 2,502,279 | 3/1950 | Rood | 137/469 |
| 2,697,915 | 12/1954 | Chisholm | 137/543.21 X |
| 2,874,718 | 2/1959 | Kelly | 137/469 |
| 2,882,924 | 4/1959 | Kleczek | 137/469 X |
| 3,189,040 | 6/1965 | Johnson | 137/469 |

Primary Examiner—Harold W. Weakley
Attorney, Agent, or Firm—Joseph Januszkiewicz

[57] ABSTRACT

A pressure relief valve for instantaneously relieving high pressure from a chamber wherein the relief valve pressure area for exhaust is greater than the initiating pressure area and having a flow relief area that is smaller than the area gauging the pressure which initiates the relief action.

1 Claim, 2 Drawing Figures

4,142,549

RELIEF VALVE

BACKGROUND OF THE INVENTION

This invention relates to a pressure relief valve for use to provide a high instantaneous flow rate.

Various forms of pressure relief valve assemblies have been proposed by manufacturers of valves, however, their complex forms and shapes and particularly their inefficient application under extreme ranges of temperatures have been drawbacks in their application to life-raft systems. The present invention overcomes these deficiencies by making a simple, inexpensive valve that is economical to manufacture and extremely efficient in instantaneously relieving an excessive pressure with a positive sealing upon reaching the predetermined pressure over a wide range of temperatures. The pressure relief valve has a fast dumping action. The valve is particularly useful in the application of life raft systems as its construction prevents premature or accidental operation yet facilitates rapid relieving of excessive pressures.

SUMMARY OF THE INVENTION

The present invention provides a relief valve for instantaneously relieving excessive pressure, wherein the pressure relief valve has a piston area larger than the relief valve's gauging area for maintaining the piston open for dumping instantaneously the excessive high pressure via a plurality of circumferentially spaced relief bores which are adjacent to the gauging area. The piston is retained and guided in its movement by an elongated bore protected from external actuation.

DETAILED DESCRIPTION

Figure 1:
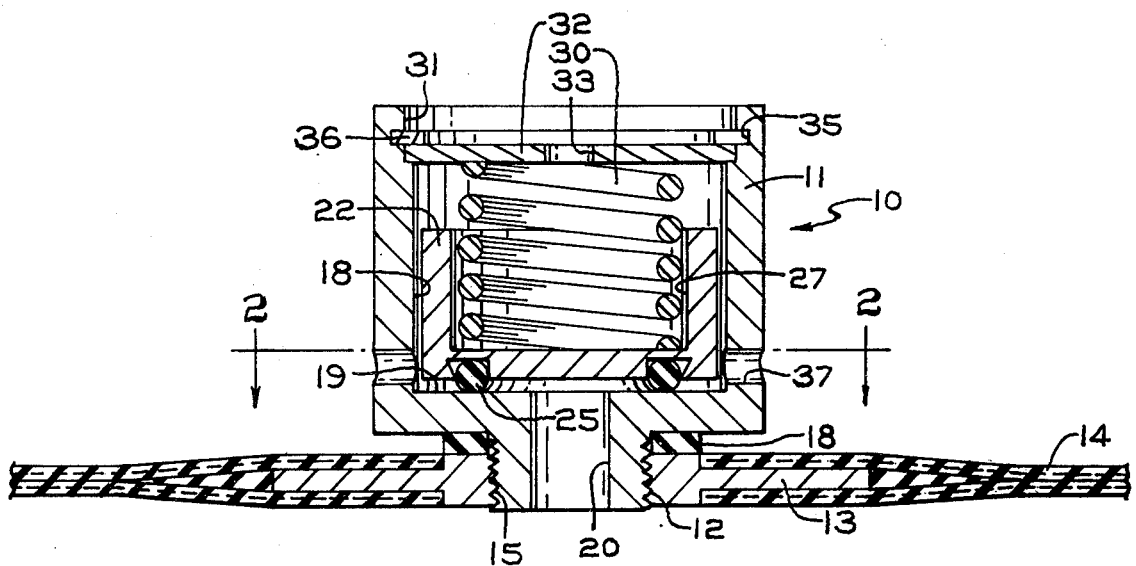
FIG. 1 is an enlarged axial cross-sectional view of a valve assembly constructed in accordance with the teachings of the invention.
Figure 2:
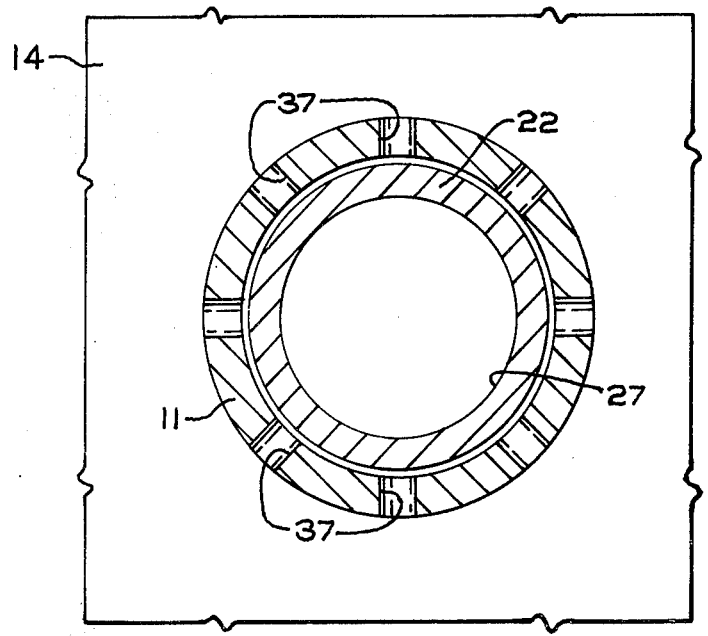
FIG. 2 is an enlarged fragmentary cross-sectional view taken on line 2—2 of FIG. 1.

Referring to the drawings wherein like reference characters designate like or corresponding parts throughout the several views there is shown in FIG. 1 a valve assembly comprising a stepped cylindrical valve housing 10 having an upper cylindrical portion 11 and a lower threaded portion 12 which threaded portion 12 is secured to a flange 13. Flange 13 is suitably bonded to a rubberized material 14 that is part of an inflatable life support raft.

Flange 13 has a centrally disposed threaded bore 15 that receives the lower threaded portion 12 of valve housing 10 to compress gasket 16 that is located on the shoulder between the lowermost end portion of cylindrical housing 11 and the threaded portion 12.

Cylindrical housing 11 has a central bore 18 extending therein forming a lower annular seat or wall 19. Bore 18 communicates with a bore 20 that extends through the lower threaded portion 12. The diameter of bore 20 is substantially smaller than the diameter of bore 18. A cup-shaped piston 22 is slidably received within bore 18 of cylindrical housing 11. The lower bottom end portion of piston 22 has an annular recess 23 along its outer periphery to receive an annular O-ring or sealing ring 25 which is adapted to seat on the annular seat 19. The mean diameter of annular ring 25 determines the pressure area which is acted upon by the pressure within the raft chamber acting through bore 20. The piston 22 is centrally recessed as at 27 to provide a seat for one end of a compression coil spring 30. The upper inner peripheral edge portion of cylindrical housing 11 is recessed as at 31 to receive an annular cap 32 which cap 32 engages the other end of compression spring 30. Cap 32 has a central bore 33. The recessed portion 31 is further grooved as at 35 to receive a retaining ring 36 which frictionally engages annular cap 32 and holds such cap in position thereon. The lower portion of cylindrical valve housing 10 has a plurality of circumferentially spaced bores 37 interconnecting the central bore 18 with atmosphere. The area of the bottom surface of piston 22 is the effective pressure area which maintains the piston valve 22 open.

In the operation of the pressure relief valve described, assume the raft to which the valve is connected is pressurized to a pressure less than the pressure which actuates the pressure relief valve (assuming a pressure of 4.0 psig for such actuation). Where the pressure rises above this pressure rapidly, then the piston 22 is moved upwardly compressing spring 30 and unseating O-ring 25 away from annular seat 19. The effective area for maintaining the piston valve 22 open is the area of the piston (effective pressure area), whereas the effective area to initially open the valve is determined by the mean diameter of O-ring 25 (pressure gauging area). The flow area is the sum total of all the bores 37 and the area of bore 33. This effective flow area is smaller than the flow area of bore 20, thereby providing for a transfer of the pressure drop from the exit of bore 20, as in conventional relief valves, to the exit of bores 37. This permits a pressure build-up in bore 18 below piston 22, thereby increasing the movement of piston 22 and thus providing an increased effective flow area and resulting in a rapid dumping of air pressure from the raft. This action of the valve compared to a conventional valve is significantly faster in relieving the pressure. Whether it is the closeness of the holes 37 adjacent to the O-ring 25 that is responsible for the efficient action is not known but the phenomenon of the quick dumping action and the snap-action of the valve is significant. Upon relieving of the pressure, the valve piston 22 is snapped into place by the spring 30.

Although a preferred embodiment of the invention has been disclosed and described, it is apparent that various modifications of the invention are contemplated and may be made without departing from the principles of the invention.

I claim:

1. A high pressure relief valve comprising a cylindrical housing with a reduced cylindrical end portion, said end portion being externally threaded, an annular flange threadedly connected to said end portion for attachment to an inflatable raft and communicating with a chamber therein, a stepped bore extending through said housing, said bore having a first upper bore portion and a second lower bore portion, said second bore portion being of smaller diameter than said first bore portion and located in said cylindrical end portion, an annular shoulder formed between said first and second bore portions defining an annular valve seat, a piston slidably received by said first bore portion, said piston having an outer wall length that is greater than one-half of the depth of first bore portion, said piston is cup-shaped, the lowermost portion of said piston having a circumferentially extending O-ring for engaging said valve seat, said O-ring exposes a portion of said annular valve seat to pressurized medium from said second bore portion, spring means extending into said cup-shaped piston and is guided by and seated therein, said spring means biasing said piston into engagement with said valve seat, said cylindrical housing having a plurality of circumferentially spaced and evenly spaced passageways communicating the exterior of said cylindrical housing with the interior of said first bore portion, said passageways located closely adjacent to said valve seat, an annular washer located in said first bore for retaining said piston in said first bore, said annular washer having a central bore for venting gases to atmosphere along with said passageways defining exhaust means, and wherein the area of said exhaust means is less that the area of said second bore which communicates with the bottom of said piston to initiate the venting of said relief valve.

* * * * *